(No Model.)
J. H. FILBERT.
PROCESS OF MAKING EDIBLE FAT.
No. 522,409. Patented July 3, 1894.
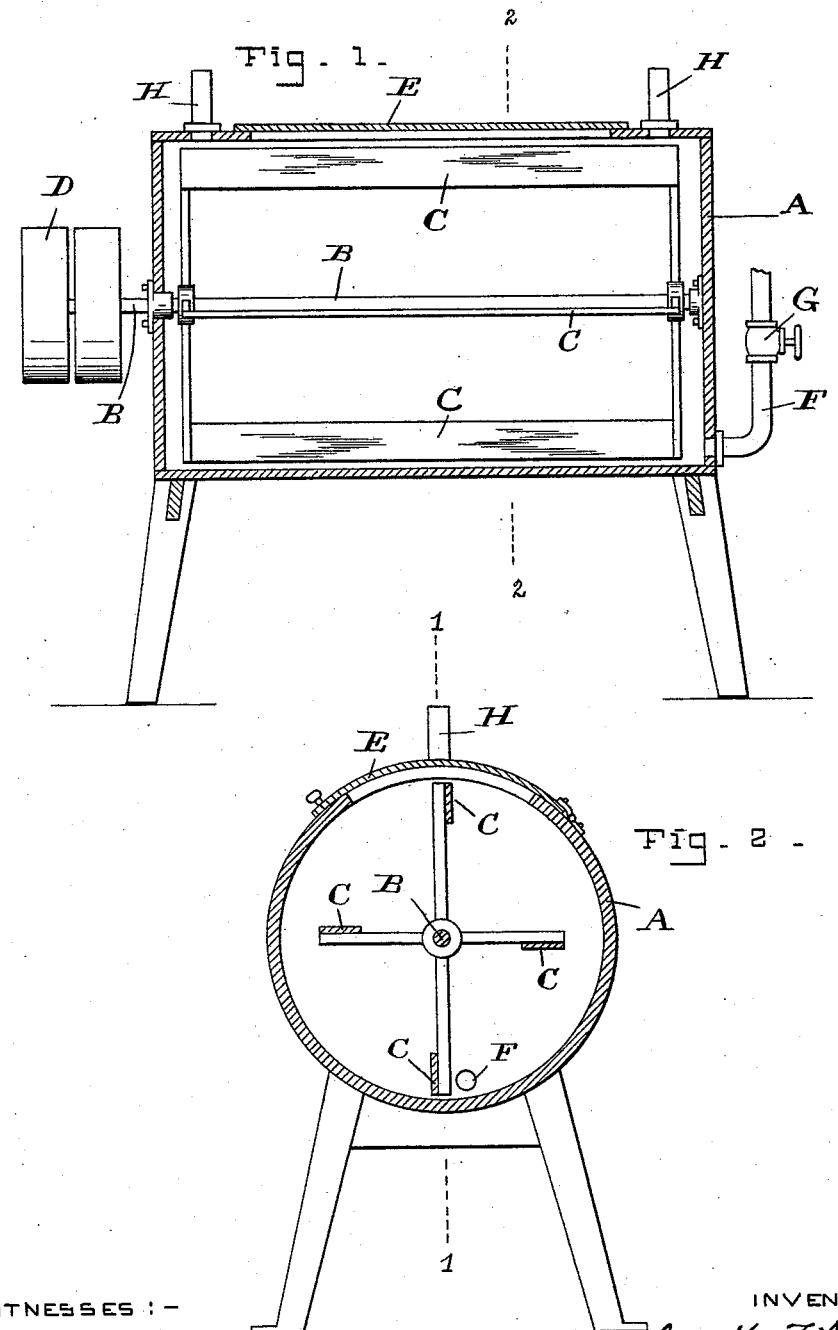
WITNESSES :—
L. I. Van Horn.
Charles B. Mann Jr.
INVENTOR :
Jno H. Filbert
By Chas B. Mann
ATTORNEY.

UNITED STATES PATENT OFFICE.

JOHN H. FILBERT, OF BALTIMORE, MARYLAND.

PROCESS OF MAKING EDIBLE FATS.

SPECIFICATION forming part of Letters Patent No. 522,409, dated July 3, 1894.

Application filed April 26, 1894. Serial No. 509,137. (No specimens.)

*To all whom it may concern:*

Be it known that I, JOHN H. FILBERT, a citizen of the United States, residing at Baltimore, in the State of Maryland, have invented certain new and useful Improvements in Methods of Manufacturing Artificial Lard, of which the following is a specification.

My invention relates to an improved process for the manufacture of edible fats compounded from animal tallow and cotton-seed oil.

The objects of the invention are to produce a superior product, perfectly homogeneous, of smooth, light, fine texture and having a color almost pure white.

I am aware that artificial lard has heretofore been made by heating to a high degree both tallow and cotton-seed oil and intimately combining them while so heated with other articles, such as caustic soda, and salt, and agitating the same quickly, then atomizing and chilling the compound during agitation, but the product thus produced lacks the desired lightness and fineness of texture and whiteness of color. I am also aware that artificial lard has heretofore been proposed by first mixing flour and cold vegetable oil and agitating the same by means of cold air blown through it and then combining with this mixture animal fats or oils in a boiling condition and agitating the whole by cold air blown through the same. There are various objections to this method, first the intense heat of boiling oil is objectionable, the resultant compound has a yellowish color and has not a smooth, light and fine texture.

My process differs essentially from either of these methods and consists in warming or slightly heating ordinary refined animal tallow to its melting point merely to reduce it to an oily or liquid condition, and in this condition it is mixed with cotton-seed oil of the temperature of the atmosphere, the two ingredients being poured into a suitable tank or receptacle. The mixture is then subjected to violent agitation, or beating by means of rapidly moving paddles, to break up or rupture the globules of the melted tallow and oil and at the same time the admixture is aerated.

In order to illustrate one form of apparatus suitable for carrying out my invention, the accompanying drawings are hereunto attached. It is to be understood however, that any other suitable apparatus or mechanism may be employed, and that my invention is not limited in this respect.

Figure 1 is a longitudinal vertical section of an apparatus suitable for the purpose. Fig. 2 is a vertical cross-section of the same.

The letter, A, designates a tank of any preferred shape, through which a shaft, B, extends; to this shaft suitable paddles or blades, C, are attached. On the exterior of the tank the shaft carries pulleys, D; a driving belt may be connected with these pulleys for imparting motion to the shaft and paddles. In the present instance the tank has a cover, E, which when in place, makes the tank close or tight. An air-pipe, F, is shown attached to the tank; this pipe may receive a supply of air from any source, and a cock, G, in the pipe will regulate and govern or entirely cut off the flow of air. Outlets, or air vents, H, are shown attached to the tank. This brief description of apparatus will be perfectly intelligible in connection with the specification here given of my improved method for treating fat and oil to produce a substitute for lard.

In carrying out my invention the proportions of the components may be varied; I use from four parts of animal tallow (by weight) and three of cotton-seed oil, to two parts tallow and one of the oil, but, as stated, the proportions may vary. The tallow must primarily be reduced to an oily or liquid condition by warming it to or above its melting point, which varies from 95° to 122° Fahrenheit; the cotton-seed oil, at the temperature of the atmosphere, is next mixed with the melted tallow, and the two ingredients placed in an agitating tank or vessel. Any size tank may be used, large or small, and the quantity processed must accord with the capacity of the tank, so that the latter will only be partially filled. In warming the tallow regard must be had to the actual temperature of the cotton-seed oil; in cold weather, I raise the temperature of the melted tallow higher than in warm weather in order to insure that the mixture will have the desired fluidity. Suppose, for instance, the temperature of the cotton-seed oil to be 54° Fahrenheit, then in melting the tallow I prefer to bring it to a temperature of about 130°; the intermixed cool oil and warm melted tallow will then register about 94°, and will possess the requisite degree of fluidity without the application of heat, which it is desirable to avoid. The mixture is now by suitable mechanism subjected to violent agitation or beating by means of numerous rapidly-moving paddles or blades, and at the same time the mixture is aerated. The action of the paddles or blades breaks up or ruptures the globules of the mixed oil and melted tallow, and the mechanical friction caused by the rapid action of the paddles or blades on the mixture not only prevents a lowering of the temperature and thereby avoids the stiffening of the mixture, but the said friction gradually raises or increases the temperature from 94°, as stated, to, say, 102°. This gradual but slight raising of temperature of the mixture without the use of artificial heat during the violent agitation, causes an increased fluidity of the oils, whereby the rupturing of the oil globules and the amalgamation of the two components are facilitated; during this agitation air is introduced into the mixture by suitable means and the conditions are such that the air is absorbed into the mixture or becomes incorporated therewith. At the comparatively low temperature at which this operation is conducted (heat not being used) the minute particles of the ruptured cotton-seed oil globules and the air will be held in suspension between the stiffer minute particles of the tallow, and will remain permanently so upon the further reduction of temperature of the compound to that of the atmosphere, and thus a thoroughly aerated product is obtained of smooth, light and fine texture and of color almost pure white, equal, if not superior, to the very best refined hog's leaf-lard.

Having thus described my invention, what I claim as new, and desire to secure by Letters Patent, is—

The herein-described method of compounding animal tallow and cotton-seed oil, consisting of melting the tallow with as little heat as possible and merely to reduce it to an oily condition; mixing therewith cotton-seed oil; rapidly agitating or beating the mixture to break up the oil-globules of the two components into minute particles and blend the same; and simultaneously with this blending of the said two components introducing air into the mixture, so that the product shall have the minute particles of the cotton-seed oil-globlules and particles of air held in suspension in the stiffer particles of the tallow.

In testimony whereof I affix my signature in the presence of two witnesses.

JOHN H. FILBERT.

Witnesses:
CHARLES B. MANN, Jr.,
C. CALVERT HINES.